US012724439B2

(12) United States Patent
Zhou et al.

(10) Patent No.: US 12,724,439 B2
(45) Date of Patent: Sep. 1, 2026

(54) GALLIUM NITRIDE REGULATOR CIRCUITS AND METHODS OF OPERATING THE SAME

(71) Applicant: Navitas Semiconductor Limited, Dublin (IE)

(72) Inventors: Songming Zhou, Shanghai (CN); Tao Liu, San Marino, CA (US)

(73) Assignee: Navitas Semiconductor Limited, Dublin (IE)

( * ) Notice: Subject to any disclaimer, the term of this patent is extended or adjusted under 35 U.S.C. 154(b) by 335 days.

(21) Appl. No.: 18/323,330

(22) Filed: May 24, 2023

(65) Prior Publication Data

US 2024/0045454 A1 Feb. 8, 2024

(30) Foreign Application Priority Data

Aug. 5, 2022 (CN) ......................... 202210938619.1

(51) Int. Cl.

*G05F 1/46* (2006.01)
*G05F 1/575* (2006.01)
*G05F 1/59* (2006.01)

(52) U.S. Cl.

CPC .............. *G05F 1/468* (2013.01); *G05F 1/575* (2013.01); *G05F 1/59* (2013.01)

(58) Field of Classification Search

CPC . G05F 1/468; G05F 1/575; G05F 1/59; G05F 1/567

See application file for complete search history.

(56) References Cited

U.S. PATENT DOCUMENTS 9,804,628 B2 * 10/2017 Hashitani ................ G05F 3/242
2020/0293074 A1 * 9/2020 Cellucci ............. G01R 19/0038
2022/0397925 A1 * 12/2022 Tiruvamattur .......... G05F 3/262
2023/0110867 A1 * 4/2023 Shah .................... H03K 17/687 327/109
2024/0248501 A1 * 7/2024 Chen ....................... G05F 3/245

* cited by examiner

*Primary Examiner* — Lakaisha Jackson
(74) *Attorney, Agent, or Firm* — FisherBroyles, LLP

(57) ABSTRACT

Gallium nitride reference voltage generation circuits. In one aspect, the circuit includes a first gallium nitride (GaN)-based transistor having a first gate terminal, a first source terminal and a first drain terminal, a second GaN-based transistor having a second gate terminal, a second source terminal and a second drain terminal, the second gate terminal coupled to the first drain terminal, an input terminal coupled to the first gate terminal and arranged to receive a first voltage, an output terminal coupled to the second source terminal, a power supply terminal coupled to the first drain terminal and the second drain terminal, and a feedback circuit coupled between the first source terminal and the second source terminal, where the first source terminal is coupled to a ground through a first impedance element, the first impedance element having a positive temperature coefficient.

17 Claims, 6 Drawing Sheets

GALLIUM NITRIDE REGULATOR CIRCUITS AND METHODS OF OPERATING THE SAME

CROSS-REFERENCES TO OTHER APPLICATIONS

This application claims priority to Chinese patent application: Serial No. 2022109386191, filed on Aug. 5, 2022, entitled "GALLIUM NITRIDE REFERENCE VOLTAGE GENERATION CIRCUIT," which is hereby incorporated by reference in its entirety for all purposes.

FIELD

The described embodiments relate generally to power converter circuits, and more particularly, the present embodiments relate to gallium nitride (GaN) reference voltage generation circuits employed in power converter circuits.

BACKGROUND

Electronic devices such as computers, servers and televisions, among others, employ one or more electrical power conversion circuits to convert one form of electrical energy to another. Some electrical power conversion circuits convert a high DC voltage to a lower DC voltage using a circuit topology called a half bridge converter. As many electronic devices are sensitive to size and efficiency of the power conversion circuit, new power converters can provide relatively higher efficiency and lower size for the new electronic devices.

SUMMARY

In some embodiments, a circuit is disclosed. The circuit includes a first gallium nitride (GaN)-based transistor having a first gate terminal, a first source terminal and a first drain terminal, a second GaN-based transistor having a second gate terminal, a second source terminal and a second drain terminal, the second gate terminal coupled to the first drain terminal, an input terminal coupled to the first gate terminal and arranged to receive a first voltage, an output terminal coupled to the second source terminal, a power supply terminal coupled to the first drain terminal and the second drain terminal, and a feedback circuit coupled between the first source terminal and the second source terminal, where the first source terminal is coupled to a ground through a first impedance element, the first impedance element having a positive temperature coefficient, and where the circuit is arranged to generate an output voltage at the output terminal that tracks the first voltage.

In some embodiments, the circuit further includes a second impedance element coupled between the first source terminal and the first impedance element, where the second impedance element has a zero temperature coefficient.

In some embodiments, the circuit further includes a third impedance element coupled between the first drain terminal and the power supply terminal, where the third impedance element has a zero temperature coefficient.

In some embodiments, the feedback circuit includes a fourth impedance element.

In some embodiments, the output voltage stays constant while an operational temperature of the circuit varies.

In some embodiments, the first and second GaN-based transistors are formed on a monolithic substrate including GaN.

In some embodiments, the monolithic substrate includes a GaN-based power transistor operated by a GaN-based driver.

In some embodiments, the GaN-based power transistor is arranged in a high-side configuration.

In some embodiments, a circuit is disclosed. The circuit includes a first circuit having a negative temperature coefficient and including a plurality of impedance elements, and a second circuit having a positive temperature coefficient and including a first GaN-based transistor and a second GaN-based transistor and the plurality of impedance elements, the second circuit operatively coupled to the first circuit, an input terminal coupled to a gate terminal of the first GaN-based transistor, and an output terminal coupled to a source terminal of the second GaN-based transistor, where an output voltage at the output terminal tracks an input voltage at the input terminal.

In some embodiments, a first of the plurality of impedance elements is coupled between a source terminal of the first GaN-based transistor and a ground.

In some embodiments, the first of the plurality of impedance elements has a positive temperature coefficient.

In some embodiments, a second of the plurality of impedance elements is coupled between the source terminal of the first GaN-based transistor and the first of the plurality of impedance elements.

In some embodiments, the second of the plurality of impedance elements has a zero temperature coefficient.

In some embodiments, the first and second GaN-based transistors are formed on a monolithic substrate including GaN.

In some embodiments, the monolithic substrate includes a GaN-based power transistor operated by a GaN-based driver.

In some embodiments, a circuit is disclosed. The circuit includes a first gallium nitride (GaN)-based transistor having a first gate terminal, a first source terminal and a first drain terminal, a second GaN-based transistor having a second gate terminal, a second source terminal and a second drain terminal, the second source terminal coupled to the first source terminal, an input terminal coupled to the first gate terminal and arranged to receive a first voltage, an output terminal coupled to the second gate terminal, and a power supply terminal coupled to the first drain terminal and the second drain terminal, where the first source terminal is coupled to a ground through a first impedance element, the first impedance element having a zero temperature coefficient, and where the circuit is arranged to generate an output voltage at the output terminal that tracks the first voltage.

In some embodiments, the circuit further includes a second impedance element coupled between the second drain terminal and the power supply terminal, where the second impedance element has a zero temperature coefficient.

In some embodiments, the circuit further includes a third impedance element coupled between the first gate terminal and the power supply terminal.

In some embodiments, the first and second GaN-based transistors are formed on a monolithic substrate including GaN.

In some embodiments, the monolithic substrate includes a GaN-based power transistor operated by a GaN-based driver.

DETAILED DESCRIPTION

Figure 1:
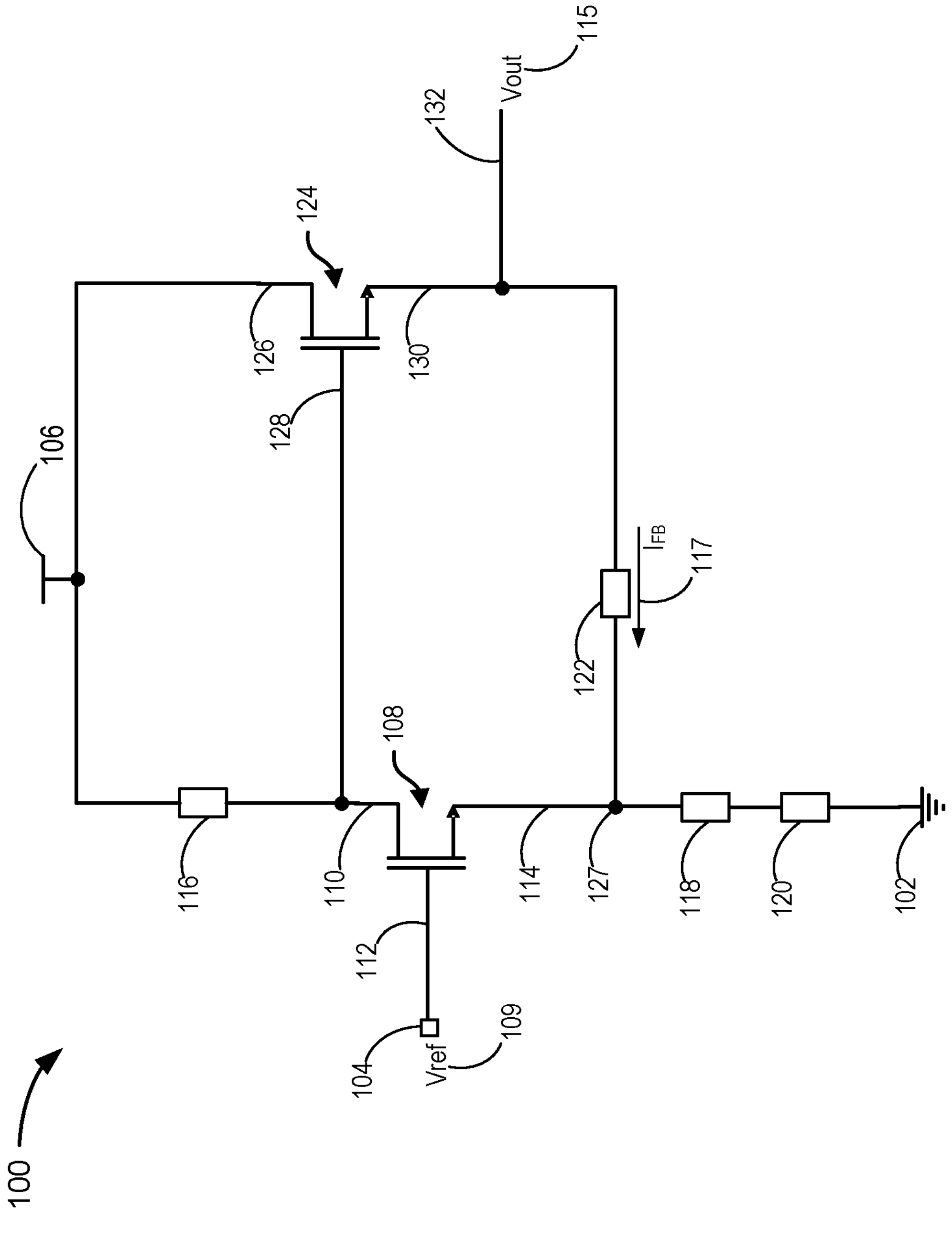
FIG. 1 illustrates a GaN-based reference voltage generation circuit according to an embodiment of the disclosure.

Circuits and related techniques disclosed herein relate generally to power conversion devices. More specifically, circuits, devices and related techniques disclosed herein relate to gallium nitride (GaN) reference voltage generation circuits. In some embodiments, a GaN-based reference voltage generation circuit can generate a reference voltage on a GaN-based integrated circuit (IC), where the reference voltage can stay at a relatively constant value while an operating temperature of the IC varies. In various embodiments, the generated reference voltage can stay at a relatively constant value while a loading of the reference voltage generation circuit varies. In some embodiments, the generated reference voltage can track an input voltage to the reference generation circuit. In various embodiments, the generated reference voltage can stay at a value that is independent of variations in the GaN-based IC power supply. In some embodiments, the generated reference voltage can track an input voltage while varying with power supply changes similar to the rest of the circuits of the GaN-based IC. In various embodiments, a reference voltage generation circuit can include a feedback circuit that can allow for compensation for variations in temperature, loading and power supply.

In some embodiments, a GaN-based reference voltage generation circuit can generate a reference voltage on a GaN-based integrated circuit (IC), thereby removing external reference voltage circuits. In this way, a GaN-based IC can operate independent of external circuitry such as silicon-based circuitry used to generate reference voltages. In various embodiments, a GaN-based reference voltage generation circuit can be used in a high-side section of a half-bridge circuit of a power converter circuit. In some embodiments, a GaN-based reference voltage generation circuit can be used in a low-side section of a half-bridge circuit of a power converter circuit. Various inventive embodiments are described herein, including methods, processes, systems, devices, and the like.

Several illustrative embodiments will now be described with respect to the accompanying drawings, which form a part hereof. The ensuing description provides embodiment(s) only and is not intended to limit the scope, applicability, or configuration of the disclosure. Rather, the ensuing description of the embodiment(s) will provide those skilled in the art with an enabling description for implementing one or more embodiments. It is understood that various changes may be made in the function and arrangement of elements without departing from the spirit and scope of this disclosure. In the following description, for the purposes of explanation, specific details are set forth in order to provide a thorough understanding of certain inventive embodiments. However, it will be apparent that various embodiments may be practiced without these specific details. The figures and description are not intended to be restrictive. The word “example” or “exemplary” is used herein to mean “serving as an example, instance, or illustration.” Any embodiment or design described herein as “exemplary” or “example” is not necessarily to be construed as preferred or advantageous over other embodiments or designs.

Current approaches in GaN-based IC reference voltage generation techniques may generate a reference voltage that varies with temperature, loading and power supply variations, because current GaN-based fabrication processes may only offer N-type transistors (transistors that use electrons in their operation), and may not offer P-type transistors (transistors that use holes in their operation).

FIG. 1 illustrates a GaN-based reference voltage generation circuit 100 according to an embodiment of the disclosure. Circuit 100 can include a transistor 108 having a drain terminal 110, a gate terminal 112 and a source terminal 114. Gate terminal 112 can be coupled to an input pad 104. In some embodiments, the input 104 pad can be configured to receive an external reference voltage Vref. Circuit 100 can further include an impedance element 116 coupled between the drain terminal and a power supply 106 (VDD). In various embodiments, an impedance element can include a resistor. In some embodiments, an impedance element may include a network of passive elements. Circuit 100 can further include an impedance element 118 coupled to the source terminal 114. Impedance element 118 can be coupled to ground node 102 through an impedance element 120. Impedance element 118 can have an impedance value R1, impedance element 120 can have an impedance value R2, and impedance element 116 can have an impedance value R3.

Circuit 100 can further include a transistor 124 having a drain terminal 126, a gate terminal 128 and a source terminal 130. Gate terminal 128 can be coupled to the drain terminal 110. The drain terminal 126 can be coupled to the power supply 106 and the source terminal 130 can be coupled to an output node 132. Circuit 100 can further include a feedback circuit that that is coupled between the source terminal 130 and the source terminal 114. In some embodiments, the feedback circuit can include an impedance element. In the illustrated embodiment, the feedback circuit includes impedance element 122 coupled between the source terminal 130 and the source terminal 114. Impedance element 122 can be used to provide feedback from node 132 and source terminal 130 to node 127. In some embodiments, impedance element 120 can be a two-dimensional electron gas (2DEG) resistor. A 2DEG resistor can have a positive temperature coefficient, i.e., as temperature increase, a value of the 2DEG resistor increases proportionally. In various embodiments, impedance elements 116 and 118 can be formed from silicon chrome (SiCr). A SiCr resistor can have a zero temperature coefficient, i.e., as temperature increase, a value of the SiCr resistor may stay relatively constant. In some embodiments, circuit 100 can be monolithically integrated in a GaN-based IC. In various embodiments, the transistors 108 and 124 can be formed on a GaN-based die, while the other components of circuit 100 can be formed on a separate die.

The operation of circuit 100 is now described. Circuit 100 can generate a reference voltage 115 (Vout) at node 132. Circuit 100 can operate in a high-side configuration where Vout can be used in a high-side section of a GaN-based IC. In some embodiments, circuit 100 can be used in a high-side arrangement in a GaN-based half-bridge circuit used for DC-DC power conversion. In various embodiments, circuit 100 can operate in a low-side configuration where Vout can be used in a low-side section of a Ga-based IC. Input pad 104 can be configured to receive an external reference voltage 109 (Vref). When a value of Vref is relatively higher than a threshold voltage of the transistor 108, transistor 108 can turn on and allow a current to flow from power supply 106 through impedance element 116, transistor 108, and impedance elements 118 and 120 to ground node 102. When transistor 108 turns on, a voltage Vgs1 can develop across gate terminal 112 to source terminal 114. Thus, a first voltage across impedance elements 118 and 120 can develop that is equal to Vref−Vgs1. Therefore, a second voltage across impedance element 116 can develop that is equal to Vref−Vgs1 because a voltage drop across drain terminal 110 to source terminal 114 can be relatively small.

When a value of gate to source voltage of the transistor 124 is relatively higher than a threshold voltage of the transistor 124, transistor 124 can turn on and a voltage Vgs2 can develop across gate terminal 128 to source terminal 130. Impedance element 122 can provide negative feedback from source terminal 130 to source terminal 114. Feedback current 117 ($I_{FB}$) can flow from source terminal 130 to source terminal 114 through impedance element 122. Thus, Vout is given by:

$$Vout = \frac{R3}{R1+R2} * (Vref - Vgs_1 - IFB * (R1 + R2)) + Vgs_2 \quad (1)$$

$$Vout = \frac{R3}{R1+R2} * Vref + \left(Vgs_2 - \frac{R3}{R1+R2} * Vgs_1 - IFB * R3\right) \quad (2)$$

In equation (2), the term $I_{FB}$*R3 (i.e., a voltage across impedance element 122) can cancel out variations in power supply VDD that may affect Vout. Thus, when VDD increases Vout increases as well thereby causing an increase in $I_{FB}$, thus reducing a current through impedance element 116. This in turn can reduce a voltage drop from VDD to Vout, thereby Vout can increase proportional to VDD increase. For the same reasoning, Vout can decrease proportional to VDD decrease.

In some embodiments, impedance element 120 can have a positive temperature coefficient, i.e., when temperature increases, R2 (impedance of impedance element 120) can increase as well. For example, impedance element 120 can be formed from a 2DEG resistor. In various embodiments, impedance elements 118 and 116 can have a zero temperature coefficient, i.e., when temperature varies, R1 and R3 can stay relatively constant. For example, impedance elements 118 and 116 can be formed from SiChrome. As appreciated by one of ordinary skill in the art having the benefit of this disclosure, impedance element 120 can be formed from any suitable material that has a positive temperature coefficient. Further, impedance elements 116 and 118 can be formed from any suitable material that has a zero temperature coefficient. In equation (2), the term $$\frac{R3}{R1+R2} * Vref$$

can have a negative temperature coefficient because R2 has a positive temperature coefficient and is in the denominator. The term $$Vgs_2 - \frac{R3}{R1+R2} * Vgs_1$$

can have a positive temperature coefficient. Thus, these two terms can cancel out temperature variations in Vout, and generate Vout that can be independent of temperature variations. This is shown graphically in FIG. 2. In some embodiments, Vout can track Vref, i.e., Vout varies proportionally with Vref.

Figure 2:
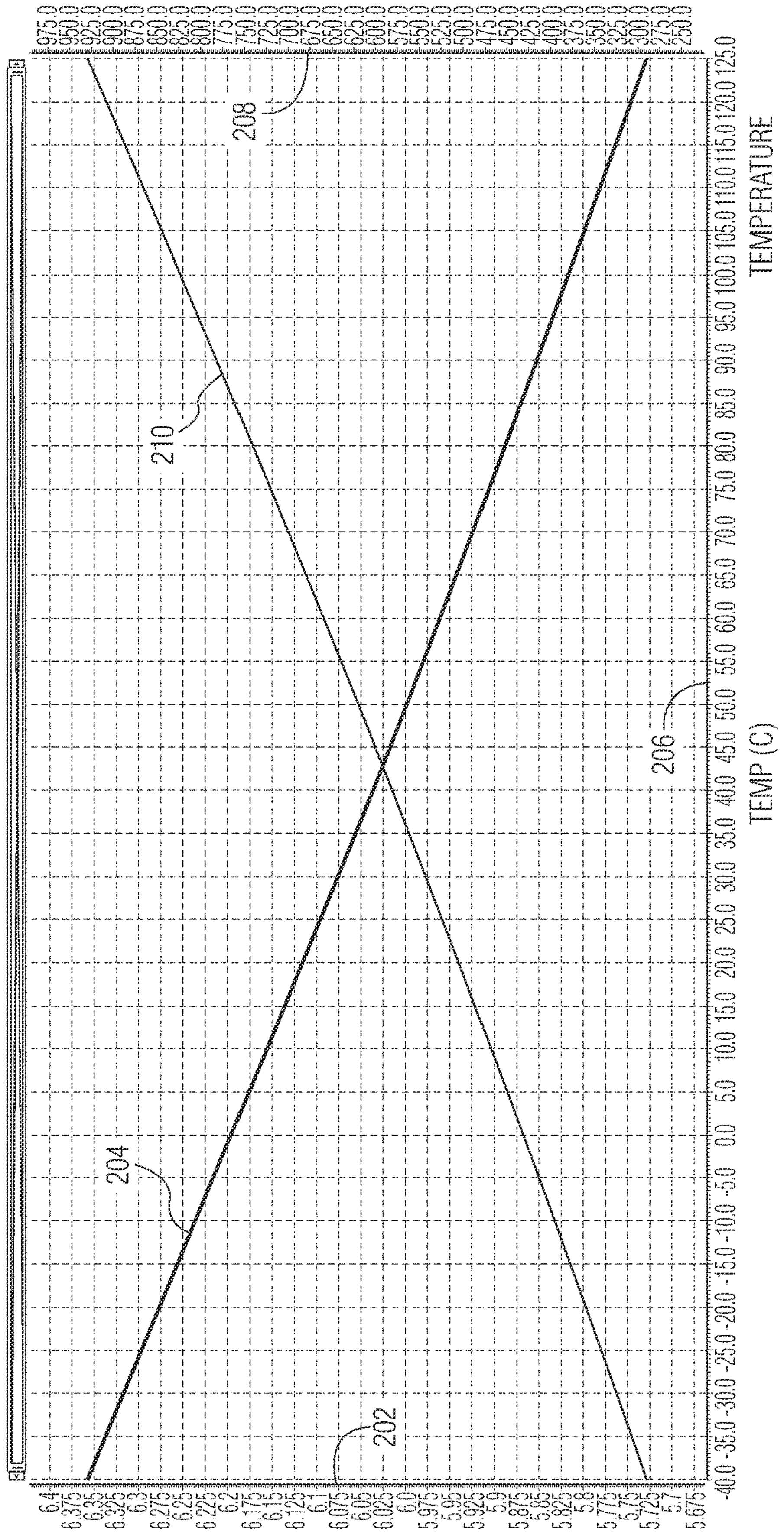
FIG. 2 illustrates a diagram showing variations with temperature for sections of the circuit of FIG. 1.
Figure 3:
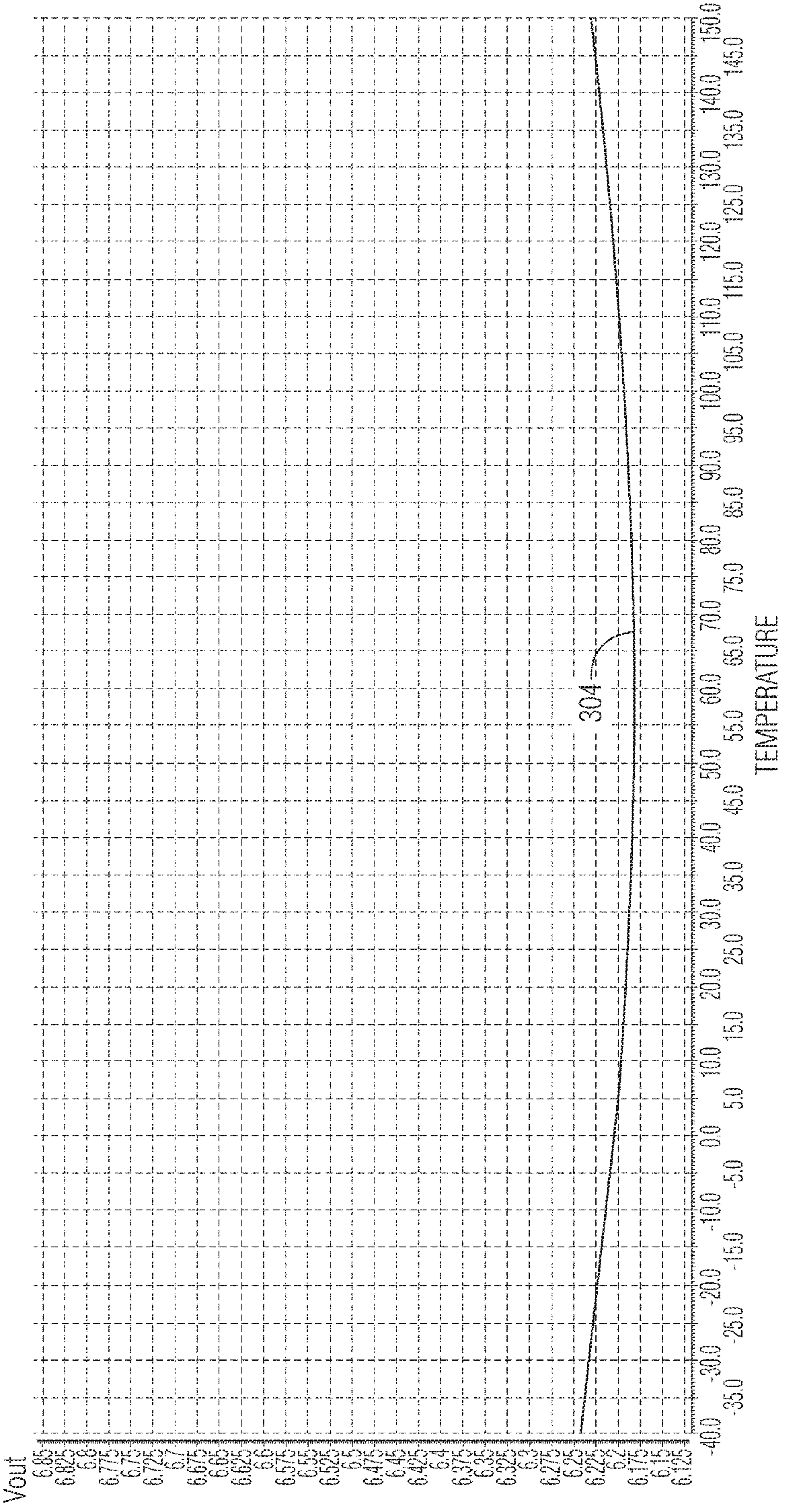
FIG. 3 shows an output voltage of the circuit of FIG. 1 as a function of temperature.
Figure 4:
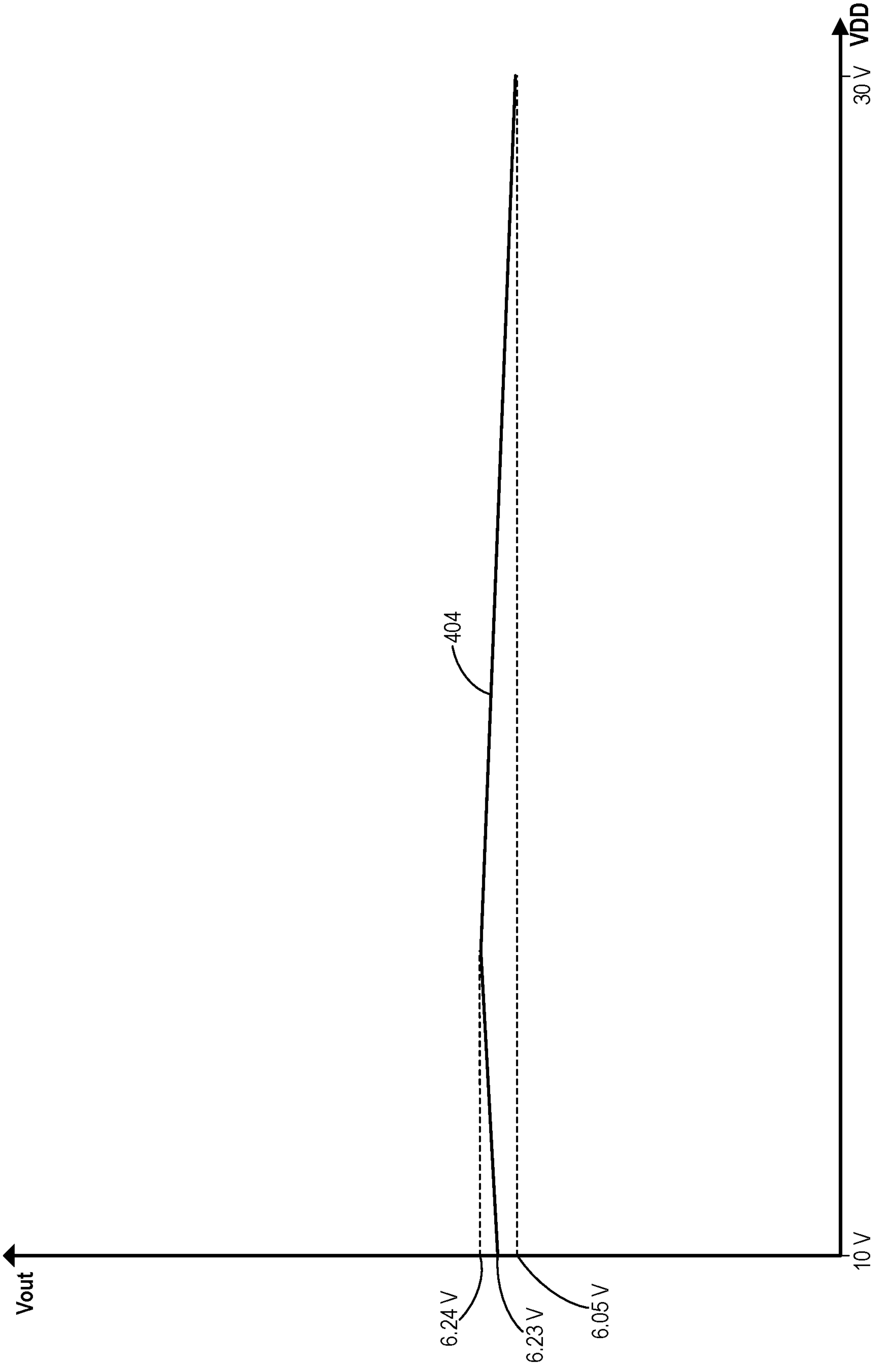
FIG. 4 shows an output voltage of the circuit of FIG. 1 as a function of power supply variations.

FIG. 2 illustrates a diagram showing variations of the terms $$\frac{R3}{R1+R2} * Vref \text{ and } Vgs_2 - \frac{R3}{R1+R2} * Vgs_1$$

as a function of temperature. The term $$\frac{R3}{R1+R2} * Vref$$

is denoted by 204 and the term $$Vgs_2 - \frac{R3}{R1+R2} * Vgs_1$$

is denoted by 210. Temperature is shown on the x-axis 206, a first voltage is shown on left Y-axis 202 and a second voltage is shown on right Y-axis 208. As can be seen in FIG. 2, the term 204 decreases with increasing temperature, while the term 210 increases with increasing temperature. Therefore, a summation of these two terms can be constant as a function of temperature. This is further shown in FIG. 3, where Vout is plotted as a function of temperature. Graph 304 shows that Vout is relatively constant as a function of temperature. Further, in FIG. 4, Vout is plotted as a function of power supply voltage VDD. Graph 404 shows that Vout is relatively constant a function of VDD. Moreover, Vout is also independent of body effect in transistor 108 and transistor 124. Body effect may cause a threshold voltage of a transistor to vary depending on a value of a voltage on a substrate of that transistor.

Figure 5:
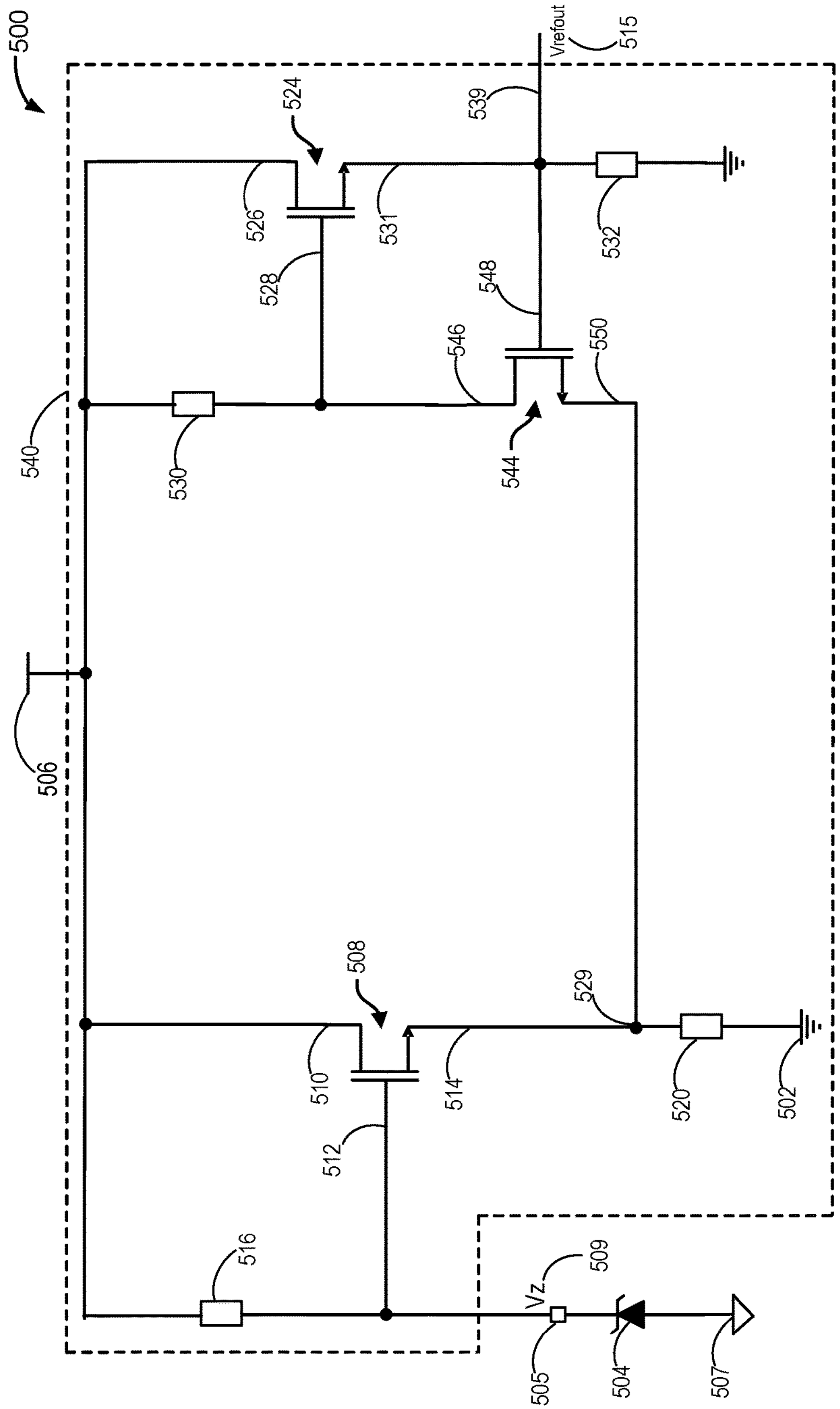
FIG. 5 illustrates a GaN-based reference voltage generation circuit according to an embodiment of the disclosure.

FIG. 5 illustrates a GaN-based reference voltage generation circuit 500 according to an embodiment of the disclosure. Circuit 500 can include circuit 540 that is coupled to a Zener diode 504. In some embodiments, circuit 540 can be monolithically integrated on a GaN-based IC while the Zener diode 504 can be external to the GaN-based IC. Circuit 540 can include a pad 505, where a cathode of the Zener diode 504 can be coupled to the pad 505. An anode of the Zener diode 504 can be coupled to an off-chip ground node 507. Circuit 540 can include a transistor 508 having a gate terminal 512, a source terminal 514 and a drain terminal 510. Circuit 540 can further include an impedance element 516 that is coupled to the gate terminal at one end and coupled to a power supply 506 at the other end. Gate terminal 512 can be coupled to the pad 505. Circuit 540 can also include an impedance element 520 that is coupled to the source terminal 514 at one end and to an on-chip ground node 502. In some embodiments, off-chip ground node 507 and on-chip ground node 502 can be electrically connected.

Circuit 540 further includes a transistor 544 having a gate terminal 548, a source terminal 550 and a drain terminal 546.

Source terminal 550 can be coupled to source terminal 514. Circuit 540 can include an impedance element 530 that is coupled to the power supply 506 at one end and coupled to the drain terminal 546 at the other end. Circuit 540 can further include a transistor 524 having a gate terminal 528, a source terminal 531 and a drain terminal 526. Gate terminal 528 can be coupled to drain terminal 546. Drain terminal 526 can be coupled to the power supply 506. Circuit 540 can further include an impedance element 532. Impedance element 532 can be coupled to the on-chip ground node 502 at one end and to the source terminal 531 at the other end. Source terminal 531 may be coupled to a node 539. Impedance elements 520, 516 and 530 can be formed from SiChrome. In some embodiments, impedance element 516 can formed from a different material than impedance elements 520 and 530. In various embodiments, circuit 540 can be monolithically integrated in a GaN-based IC. In some embodiments, circuit 500 can be monolithically integrated in a GaN-based IC on a GaN-based substrate.

The operation of circuit 500 is now described. Circuit 500 can generate a reference voltage 515 (Vrefout) at node 539. Circuit 500 can operate in a low-side configuration where Vrefout can be used in a low-side section of an IC. In some embodiments, circuit 500 can be used in a low-side arrangement of a GaN-based half-bridge circuit used for DC-DC power conversion. In various embodiments, circuit 500 can operate in a high-side configuration where Vrefout can be used in a high-side section of an IC. Input pad 505 can be configured to receive a voltage 509 (Vz) generated by the Zener diode 504. When a value of Vz is relatively higher than a threshold voltage of the transistor 508, transistor 508 can turn on and allow a current to flow from power supply 506 through impedance element 520 to on-chip ground node 502. When transistor 508 turns on, a voltage Vgs3 can develop across gate terminal 512 to source terminal 514.

Thus, a voltage equal to Vz–Vg3 can appear at node 529. Since the source terminal 550 is coupled to the source terminal 514, a voltage equal to Vz can appear at the gate terminal 548 because transistors 508 and 544 can have similar gate-to-source voltage drops. Therefore, Vz can appear at output node 539. Transistor 544, impedance elements 520 and 530 and transistor 524 can form a feedback circuit that can adjust the output voltage Vrefout. For example, when Vrefout is relatively high, increased current can flow though transistor 544 and impedance element 530, therefore a voltage at gate terminal 528 may decrease resulting in reduced Vrefout. In this way, Vrefout can stay relatively constant over varying load conditions. As an example, when a value of Vz is 6 V, Vrefout can also be at 6 V.

Figure 6:
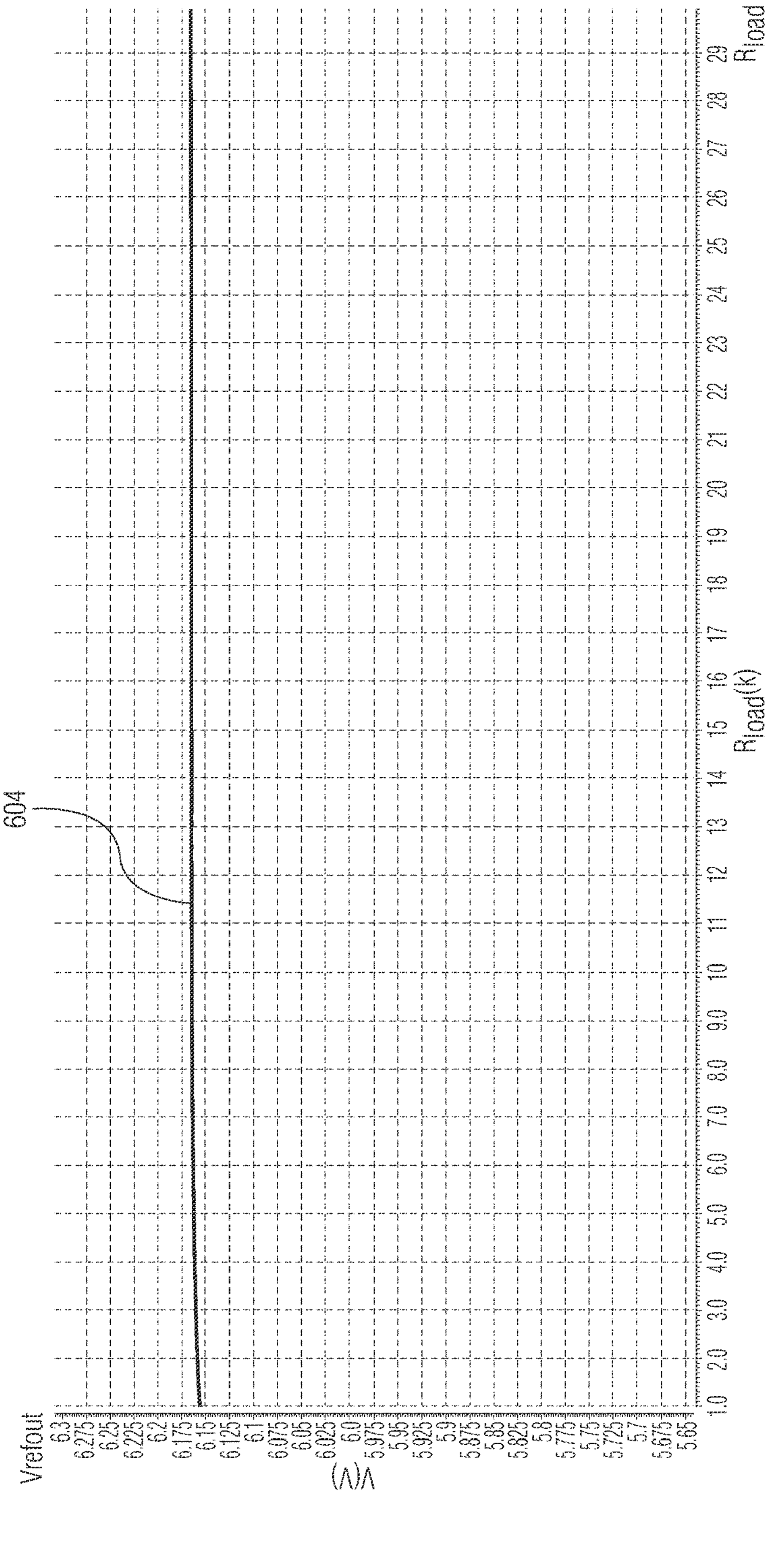
FIG. 6 shows a plot of an output voltage of the circuit of FIG. 5 as a function of loading conditions.

FIG. 6 shows a plot of Vrefout as a function of loading conditions. Graph 604 shows Vrefout as a function of an impedance of the impedance element 532. Graph 604 shows Vrefout having a relatively flat response with respect to varying loading conditions, i.e., as relatively higher amounts of current are drawn from node 539, Vrefout stays flat. Further, Vrefout can move with the in sync with the power supply. Moreover, Vrefout can be independent of temperature variations.

Although GaN-based reference voltage generation circuits are described and illustrated herein with respect to one particular configuration of GaN-based reference voltage generation circuits, embodiments of the disclosure are suitable for use with other configurations of GaN-based and non-GaN-based circuits, such as for use in power converter circuits using silicon, silicon-carbide or other semiconductor devices.

In the foregoing specification, embodiments of the disclosure have been described with reference to numerous specific details that can vary from implementation to implementation. The specification and drawings are, accordingly, to be regarded in an illustrative rather than a restrictive sense. The sole and exclusive indicator of the scope of the disclosure, and what is intended by the applicants to be the scope of the disclosure, is the literal and equivalent scope of the set of claims that issue from this application, in the specific form in which such claims issue, including any subsequent correction. The specific details of particular embodiments can be combined in any suitable manner without departing from the spirit and scope of embodiments of the disclosure.

Additionally, spatially relative terms, such as "bottom or "top" and the like can be used to describe an element and/or feature's relationship to another element(s) and/or feature(s) as, for example, illustrated in the figures. It will be understood that the spatially relative terms are intended to encompass different orientations of the device in use and/or operation in addition to the orientation depicted in the figures. For example, if the device in the figures is turned over, elements described as a "bottom" surface can then be oriented "above" other elements or features. The device can be otherwise oriented (e.g., rotated 90 degrees or at other orientations) and the spatially relative descriptors used herein interpreted accordingly.

Terms "and," "or," and "an/or," as used herein, may include a variety of meanings that also is expected to depend at least in part upon the context in which such terms are used. Typically, "or" if used to associate a list, such as A, B, or C, is intended to mean A, B, and C, here used in the inclusive sense, as well as A, B, or C, here used in the exclusive sense. In addition, the term "one or more" as used herein may be used to describe any feature, structure, or characteristic in the singular or may be used to describe some combination of features, structures, or characteristics. However, it should be noted that this is merely an illustrative example and claimed subject matter is not limited to this example. Furthermore, the term "at least one of" if used to associate a list, such as A, B, or C, can be interpreted to mean any combination of A, B, and/or C, such as A, B, C, AB, AC, BC, AA, AAB, ABC, AABBCCC, etc.

Reference throughout this specification to "one example," "an example," "certain examples," or "exemplary implementation" means that a particular feature, structure, or characteristic described in connection with the feature and/or example may be included in at least one feature and/or example of claimed subject matter. Thus, the appearances of the phrase "in one example," "an example," "in certain examples," "in certain implementations," or other like phrases in various places throughout this specification are not necessarily all referring to the same feature, example, and/or limitation. Furthermore, the particular features, structures, or characteristics may be combined in one or more examples and/or features.

In the preceding detailed description, numerous specific details have been set forth to provide a thorough understanding of claimed subject matter. However, it will be understood by those skilled in the art that claimed subject matter may be practiced without these specific details. In other instances, methods and apparatuses that would be known by one of ordinary skill have not been described in detail so as not to obscure claimed subject matter. Therefore, it is intended that claimed subject matter not be limited to the particular examples disclosed, but that such claimed subject matter may also include all aspects falling within the scope of appended claims, and equivalents thereof.

What is claimed is:

1. A circuit comprising:
a first gallium nitride (GaN)-based transistor having a first gate terminal, a first source terminal and a first drain terminal;
a second GaN-based transistor having a second gate terminal, a second source terminal and a second drain terminal, the second gate terminal coupled to the first drain terminal;
an input terminal coupled to the first gate terminal and arranged to receive a first voltage;
an output terminal coupled to the second source terminal;
a power supply terminal coupled to the first drain terminal and the second drain terminal; and
a feedback circuit coupled between the first source terminal and the second source terminal;
wherein the first source terminal is coupled to a ground through a first impedance element, the first impedance element having a positive temperature coefficient; and
wherein the circuit is arranged to generate an output voltage at the output terminal that tracks the first voltage.

2. The circuit of claim 1, further comprising a second impedance element coupled between the first source terminal and the first impedance element, wherein the second impedance element has a zero temperature coefficient.

3. The circuit of claim 2, further comprising a third impedance element coupled between the first drain terminal and the power supply terminal, wherein the third impedance element has a zero temperature coefficient.

4. The circuit of claim 3, wherein the feedback circuit comprises a fourth impedance element.

5. The circuit of claim 1, wherein the output voltage stays constant while an operational temperature of the circuit varies.

6. The circuit of claim 1, wherein the first and second GaN-based transistors are formed on a monolithic substrate including GaN.

7. The circuit of claim 6, wherein the monolithic substrate includes a GaN-based power transistor operated by a GaN-based driver.

8. The circuit of claim 7, wherein the GaN-based power transistor is arranged in a high-side configuration.

9. A circuit comprising:
a first circuit having a negative temperature coefficient and including a plurality of impedance elements; and
a second circuit having a positive temperature coefficient and including a first GaN-based transistor and a second GaN-based transistor and the plurality of impedance elements, the second circuit operatively coupled to the first circuit;
a first gallium nitride (GaN)-based transistor having a first gate terminal, a first source terminal and a first drain terminal;
a second GaN-based transistor having a second gate terminal, a second source terminal and a second drain terminal, the second gate terminal coupled to the first drain terminal;
a plurality of impedance elements including a first impedance element and a second impedance element, the first source terminal coupled to a ground through the first impedance element and the second impedance element;
an input terminal coupled to the first gate terminal of the first GaN-based transistor; and
an output terminal coupled to the second source terminal of the second GaN-based transistor;
wherein an output voltage at the output terminal tracks an input voltage at the input terminal;
wherein a voltage term dependent on a gate-source voltage of the first GaN-based transistor and a gate-source voltage of the second GaN-based transistor has a positive temperature coefficient and a voltage term dependent on the first impedance element has a negative temperature coefficient, the positive temperature coefficient and the negative temperature coefficient arranged to substantially cancel; and
wherein a first the first impedance element of the plurality of impedance elements is directly coupled to the second impedance element of the plurality of impedance elements.

10. The circuit of claim 9, wherein the second impedance element of the plurality of impedance elements has a zero temperature coefficient.

11. The circuit of claim 9, wherein the first and second GaN-based transistors are formed on a monolithic substrate including GaN.

12. The circuit of claim 11, wherein the monolithic substrate includes a GaN-based power transistor operated by a GaN-based driver.

13. A circuit comprising:
a first gallium nitride (GaN)-based transistor having a first gate terminal, a first source terminal and a first drain terminal;
a second GaN-based transistor having a second gate terminal, a second source terminal and a second drain terminal, the second source terminal coupled to the first source terminal;
an input terminal coupled to the first gate terminal and arranged to receive a first voltage;
an output terminal coupled to the second gate terminal; and
a power supply terminal coupled to the first drain terminal and the second drain terminal;
wherein the first source terminal is coupled to a ground through a first impedance element, the first impedance element having a zero temperature coefficient, and
wherein the circuit is arranged to generate an output voltage at the output terminal that tracks the first voltage.

14. The circuit of claim 13, further comprising a second impedance element coupled between the second drain terminal and the power supply terminal, wherein the second impedance element has a zero temperature coefficient.

15. The circuit of claim 13, further comprising a third impedance element coupled between the first gate terminal and the power supply terminal.

16. The circuit of claim 13, wherein the first and second GaN-based transistors are formed on a monolithic substrate including GaN.

17. The circuit of claim 16, wherein the monolithic substrate includes a GaN-based power transistor operated by a GaN-based driver.

* * * * *